(12) United States Patent
Minegishi et al.

(10) Patent No.: US 6,485,394 B1
(45) Date of Patent: Nov. 26, 2002

(54) GEARED MOTOR AND GEARED MOTOR SERIES

(75) Inventors: Kiyoji Minegishi, Chita-gun; Jun Tamenaga, Ohbu, both of (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 106 days.

(21) Appl. No.: 09/678,381

(22) Filed: Oct. 3, 2000

(30) Foreign Application Priority Data

Oct. 4, 1999 (JP) .......................................... 11-283014

(51) Int. Cl.$^7$ ........................... B60K 41/20; H02P 5/04; H02P 7/04
(52) U.S. Cl. ..................... 477/183; 477/190; 74/606 R; 475/269
(58) Field of Search ................................ 477/183, 185, 477/186, 187; 475/269, 293, 298; 74/606 R, 331

(56) References Cited

U.S. PATENT DOCUMENTS 4,898,065 A * 2/1990 Ogata et al. ................. 475/179
5,651,747 A * 7/1997 Minegishi et al. .......... 475/176
5,934,156 A * 8/1999 Phillips ..................... 74/606 R

\* cited by examiner

Primary Examiner—Sherry Estremsky
Assistant Examiner—Tisha D. Lewis
(74) Attorney, Agent, or Firm—Arent Fox Kintner Plotkin & Kahn (57) ABSTRACT

A geared motor in which user needs for change gear ratios are met with flexibility and reliability, and an increase in noise is suppressed. The geared motor comprises a motor unit and a change gear unit for transmitting rotational power from this motor unit in combination. A simple planetary roller unit including a simple planetary roller mechanism and a casing for accommodating this simple planetary roller mechanism is interposed between the change gear unit and the motor unit. The simple planetary roller mechanism has a sun roller, planetary rollers, and a ring roller. Flange portions spreading outward in the radial directions of the sun roller are formed on both axial ends of the casing. One of the flange portions is coupled to the motor unit, and the other is to the change gear unit. Moreover, the geared motor is configured so that rotational power from the motor unit is transmitted to the change gear unit through the simple planetary roller unit.

5 Claims, 10 Drawing Sheets

GEARED MOTOR AND GEARED MOTOR SERIES

BACKGROUND OF THE INVENTION

1. Field of the Invention

The invention relates to a geared motor having a motor unit and a change gear unit for transmitting rotational power from this motor unit in combination, and a geared motor series from which this geared motor can be constructed.

2. Description of the Related Art

Geared motors comprising a motor unit for generating rotational power and a change gear unit for reducing or increasing the speed of the rotational power in combination are widely used in every industrial field, because their motor speeds are mechanically reduced or increased, they are capable operating their motor units in a most efficient state (revolution range).

Figure 10:
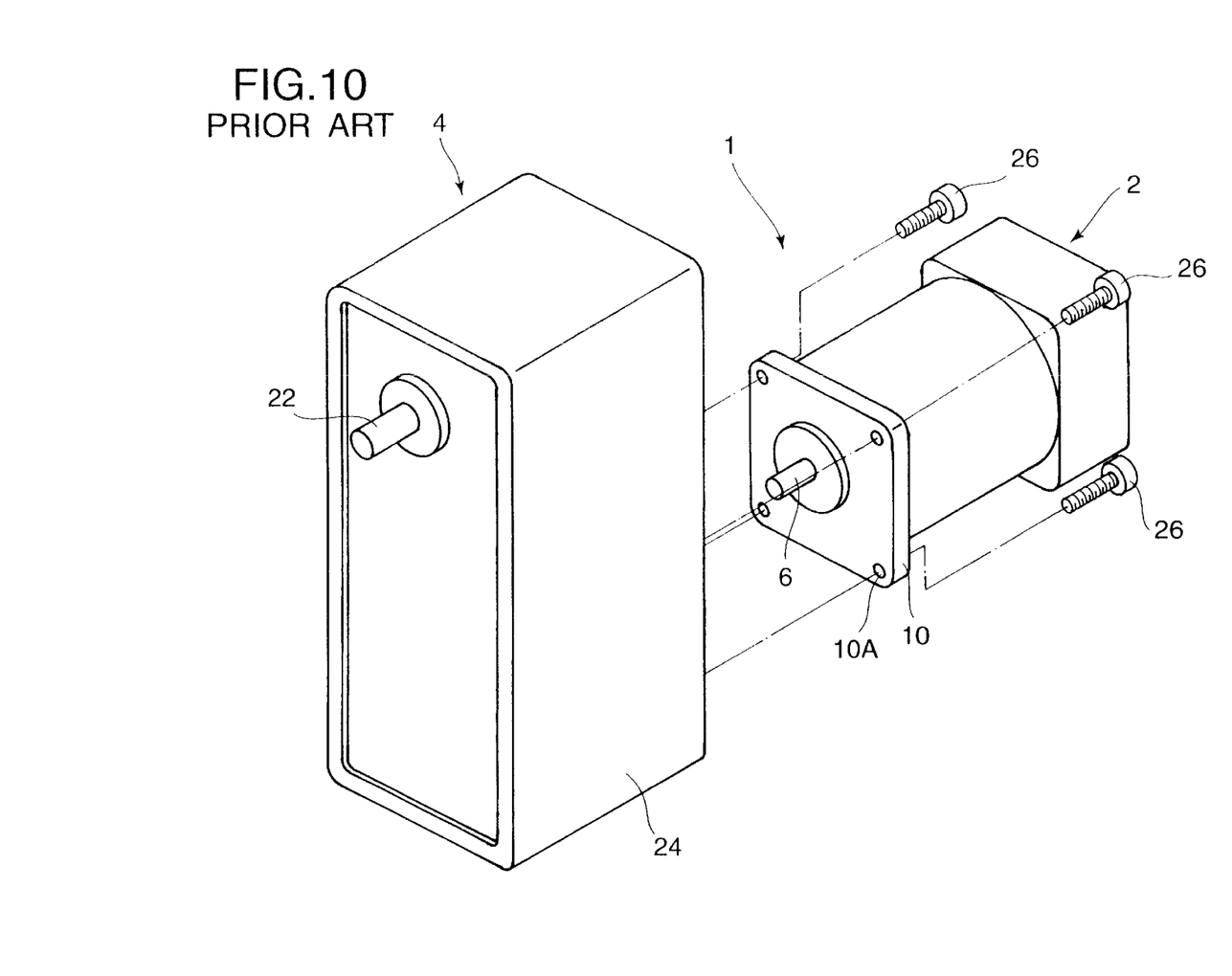
FIG. 10 is a disassembled perspective view showing the geared motor.

For example, a conventional geared motor 1 shown in FIG. 10 comprises a motor unit 2 and a change gear unit 4 for transmitting rotational power from the motor unit 2 in combination.

This motor unit 2 has a mounting surface consisting of a square motor flange 10 formed thereon at the top side of its motor shaft 6. This motor flange 10 has bolt holes 10A formed therethrough at the four corners. The motor shaft 6 is located at the center of the motor flange 10.

Figure 9:
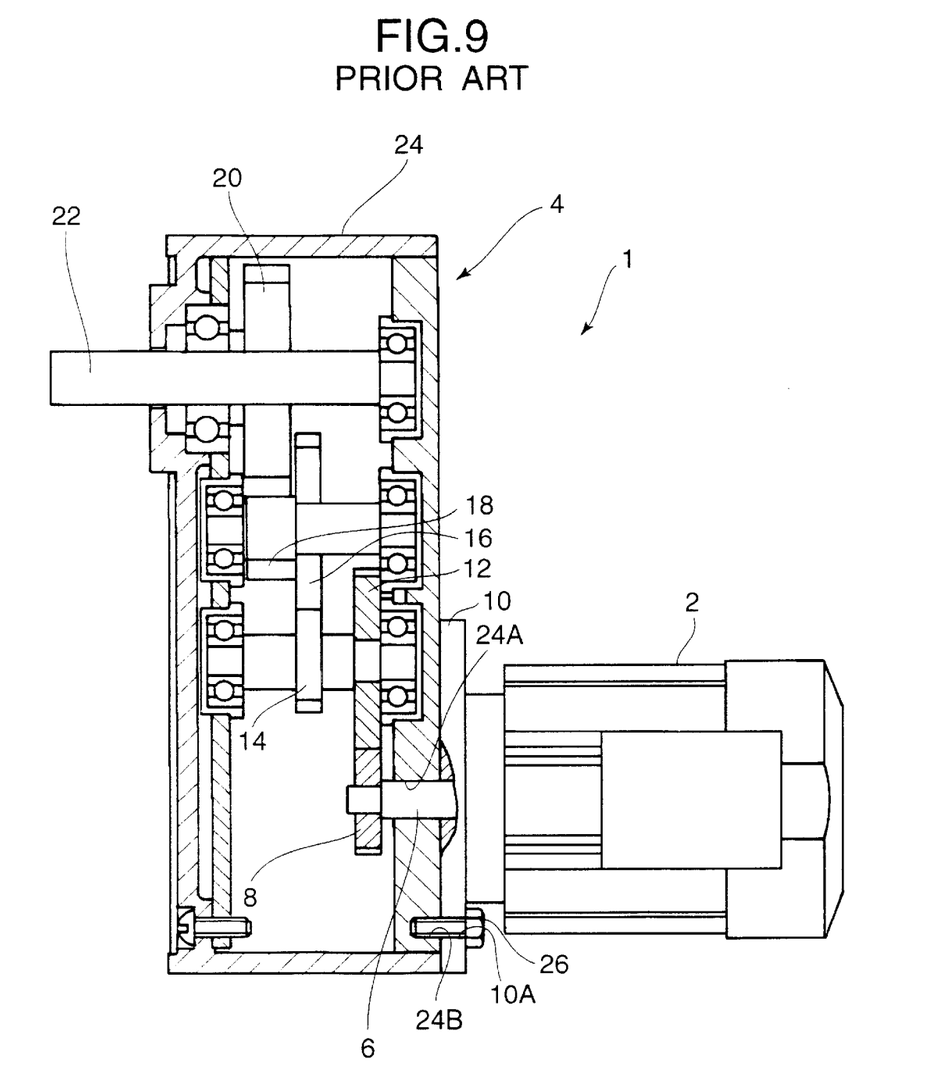
FIG. 9 is a partially sectional view showing a conventional geared motor.

The motor unit 2 outputs rotational power through the motor shaft 6. As shown in FIG. 9, the end of this motor shaft 6 is splined so as to support a helical motor pinion 8 rotatively.

The change gear unit 4 has a three-stage reduction structure. Specifically, the change gear unit 4 comprises: a first gear 12 meshing with the motor pinion 8; a first pinion 14 for making coaxial, integral rotation with the first gear 12; a second gear 16 meshing with the first pinion 14; a second pinion 18 for making coaxial, integral rotation with the second gear 16; an output shaft gear 20 meshing with the second pinion 18; an output shaft 22 supported by a bearing, for making integral rotation with the output shaft 22; and a casing 24 for accommodating these change gear mechanisms.

A shaft insertion hole 24A to which the motor shaft 6 is inserted is formed through the casing 24. The casing 24 is also provided with tapped holes 24B formed at the individual corners of a square with the shaft insertion hole 24A at the center. The shaft insertion hole 24A and the four tapped holes 24B are arranged to coincide with the motor shaft 6 and the four bolt holes 10A in the motor flange 10 of the motor unit 2, respectively, so that the motor unit 2 and the change gear unit 4 are coupled to each other by four bolts 26, as shown in FIG. 10.

In this geared motor 1, rotational power from the motor unit 2 is transmitted through the individual pinions and gears to the output shaft 22 at a predetermined reduction ratio.

For this type of geared motor 1, in general, a plurality of serialized change gear units 4 set at change gear ratios with predetermined intervals (common ratios) are provided in advance. Of these, one change gear unit 4 having the change gear ratio closest to an actually-required change gear ratio is combined with the motor unit 2 to construct a geared motor 1.

As described above, a user of the geared motor 1 selects a change gear unit 4 having the most appropriate change gear ratio from among the series with a variety of change gear ratios. According to the use patterns of the geared motor 1, however, a modification to the change gear ratio is sometimes needed afterwards. Possible measures to be taken here include the following:

1) Replace the change gear unit 4 with a new one having an optimum change gear ratio
2) Add a change gear unit having an adjusting change gear ratio to between the change gear unit 4 and the motor unit 2.

The measures 1), however, require purchase of the new change gear unit 4, giving rise to an increase in cost and a problem of wasting the change gear unit 4 used heretofore.

As for the measures 2), the change gear unit 4 used previously was intended for to-motor coupling in the first place. Therefore, the interposition of a change gear unit between the change gear unit 4 and the motor unit 2 was often difficult in practice, and involved considerable problems. The reasons therefor will be described in concrete terms hereinafter.

A first problem is that the change gear unit 4 has a mounting surface structure of "receiving" type alone, and hence it is physically difficult to couple an additional (other-than-motor-unit) change gear unit or the like (hereinafter, referred to as insert unit) thereto.

A motor unit 2 is always coupled to an apparatus to be driven (mating machine) such as the change gear unit 4. To facilitate this coupling, there is typically provided a motor flange 10 as shown in FIG. 10. This aims to insert bolts 26 to the bolt holes 10A from the motor side, and threadedly engage the bolts 26 with the tapped holes 24B on the mating-machine side to allow the coupling.

As a result of this, many reduction gear units 4 simply have a structure of "receiving" it. More specifically, reduction gear units 4 often have nothing but simple tapped holes 24B formed at the individual corners of a square around their shaft insertion hole 24A to which the motor shaft 6 is inserted; that is, there is little assumption that the coupling may be established by bolting from the reduction-unit-4 side.

Turning now to an insert unit itself, suppose that the change gear mechanism in the insert unit has a parallel axis gear structure containing pinions and gears in combination. In a single-stage reduction mechanism, it would be impossible for the insert unit to establish coaxiality between the motor shaft 6 inserted thereto and its own output shaft for transmitting the rotation of the motor shaft 6 to the reduction gear unit 4. Therefore, two or more stages (two or more pairs of gears and pinions) are logically required in order to make coaxial the motor shaft 6 and the output shaft in the insert unit. The insertion unit thus becomes complicated in internal structure, as well as extended along the axial direction of the motor shaft 6.

A second problem is that even though the main objective is to make an adjustment in change gear ratio, it is not always possible to achieve a user-intended change gear ratio.

Change gear units, as described before, are serialized with change gear ratios of regular intervals in advance. Therefore, combining the same with serialized insert units of another types cannot always achieve a desired change gear ratio. That is, combinations of change gear ratios obtainable from ordinary geared speed-change units lead to only a limited variation of change gear ratios, failing to make fine adjustments according to an actual change gear ratio needed.

A third problem is that combining two change gear units increases noise greatly. To be more specific, there occur the problems that the change gear units combined produce resonance with each other, and that a rise in the number of gears makes the gears themselves produce higher noise.

SUMMARY OF THE INVENTION

The present invention has been achieved in view of the foregoing problems. It is thus an object of the present invention to provide a geared motor which can meet user needs for change gear ratios with flexibility and reliability as well as suppresses an increase in noise, and a geared motor series from which a plurality of types of such geared motors can be constructed.

The invention according to claim 1 achieves the foregoing object by the provision of a geared motor comprising a motor unit and a change gear unit for transmitting rotational power from the motor unit in combination, the change gear unit being arranged with its input shaft coaxial to a motor shaft of the motor unit, wherein: a simple planetary roller unit including a simple planetary roller mechanism and a casing for accommodating the simple planetary roller mechanism is interposed between the change gear unit and the motor unit, the simple planetary roller mechanism having a sun roller, a planetary roller retained by a carrier, and a ring roller, the planetary roller making rolling contact with the outer periphery of the sun roller and with the inner periphery of the ring roller; and flange portions spreading outward in the radial directions of the sun roller are formed on the casing for accommodating the simple planetary roller mechanism, at both ends in the axial direction of the sun roller, and one of the flange portions is coupled to a casing of the motor unit and the other is coupled to a casing of the change gear unit, and the geared motor is configured so that rotational power from the motor unit is coaxially transmitted to the change gear unit through the simple planetary roller unit.

This geared motor adopts a simple planetary roller mechanism as the insert unit. The simple planetary roller mechanism is capable of fine adjustments to the outside diameter of its ring roller, and therefore can flexibly meet a more delicate change gear ratio as compared with geared speed change structures which are controlled by the numbers of teeth, modules, and the like. Besides, this simple planetary roller mechanism has the advantages that its input and output shafts can be easily made coaxial, and that higher change gear ratios can be obtained from a compact configuration.

Then, the present inventors has found that the characteristic configurations of the simple planetary roller mechanism and the casing supporting the same can be utilized to provide a flange structure on both sides, and has conceived that it is thereby possible to solve a number of problems existing heretofore, such as noises and fine adjustments to the change gear ratio, in whole.

More specifically, in this geared motor, the casing for accommodating the simple planetary roller mechanism has a double-flange structure. Therefore, even if the mating machines (change gear unit, motor unit) have structural difficulty in being coupled to other units, the flanges allow easy coupling therebetween. The reason is that it is possible to insert coupling bolts from the flange sides and threadedly engage the same with tapped holes in the mating machines.

By the way, it is publicly known, in the sense of general concepts, that transmission apparatuses comprising traction rollers can reduce noise as compared with geared transmission apparatuses. When the present inventors adopted a transmission apparatus of simple planetary roller mechanism and interposed this simple planetary roller unit to between a reduction gear unit and a motor unit, however, they found an unexpected noise reduction effect that the total noise becomes significantly lower than before the interposition, i.e., when the change gear unit and the motor unit were directly coupled to each other (U.S. patent application Ser. No. 09/526,284).

Although there are many uncertainties, the reason for this seems to be that this simple planetary roller mechanism has a characteristic power transmission structure utilizing the rotations and revolutions of its planetary rollers, and transmits rotational power by means of friction between the contact surfaces of (the plurality of) rollers. Here, the individual contact surfaces and the portions supporting the planetary rollers can well absorb the vibrations and noises which used to occur from the resonance between the motor unit and the change gear unit. In any case, the effect of noise reduction is as dramatic as far beyond expectations.

Moreover, as a result of forming flange portions on both sides of the casing, it becomes possible to couple any motor unit and change gear unit across the flange sides, permitting easy provision of a geared motor series including a variety of combinations. That is, since the two flange portions may be formed into different configurations (different bolt arrangements), even such motor units and change gears unit as never used to be combinable can be coupled to each other through the interposition of this simple planetary roller unit. This allows the provision of a wide-ranged geared motor series.

Besides, upon the interposition of this simple planetary roller mechanism to between a motor unit and a change gear unit coupled previously, both of the flange portions may be provided with a plurality of bolt holes formed therethrough along the axial direction of the sun roller so as to be identical to each other in arrangement. Then, mounting bolts inserted to the bolt holes may couple one the flange portions to the casing of the motor unit and the other to the casing of the change gear unit.

Of course it is also possible that both of the flange portions are provided with the above-mentioned bolt holes in different arrangements as well as those bolt holes in identical arrangements. This provides further versatility for applications.

Moreover, in the foregoing invention, the ring roller may be fixed to the casing for accommodating the simple planetary roller mechanism so that the rotation of the ring roller is restrained. Then, a shaft insertion hole is formed on (or through) the rotational center of the sun roller, and either the motor shaft of the motor unit or the input shaft of the change gear unit is inserted to the shaft insertion hole. A shaft insertion hole is formed on (or through) the rotational center of the carrier, and the other of the motor shaft and the input shaft is inserted to the shaft insertion hole. Thereby, rotational power from the motor unit is coaxially transmitted to the change gear unit through the simple planetary roller mechanism.

According to this invention, it is possible to install the simple planetary roller unit in place of a coupling which used to couple the motor shaft and the input shaft of the change gear unit. Therefore, the simple planetary roller unit offers the same functions as those of a shaft coupling even after the addition of speed change function.

Incidentally, "change gear unit" employed in the present invention means a unit that changes the rotational speed of input rotational power for output, including a reduction unit, a step-up unit, and the like.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, embodiments of the present invention will be described in detail with reference to the drawings.

Figure 1:
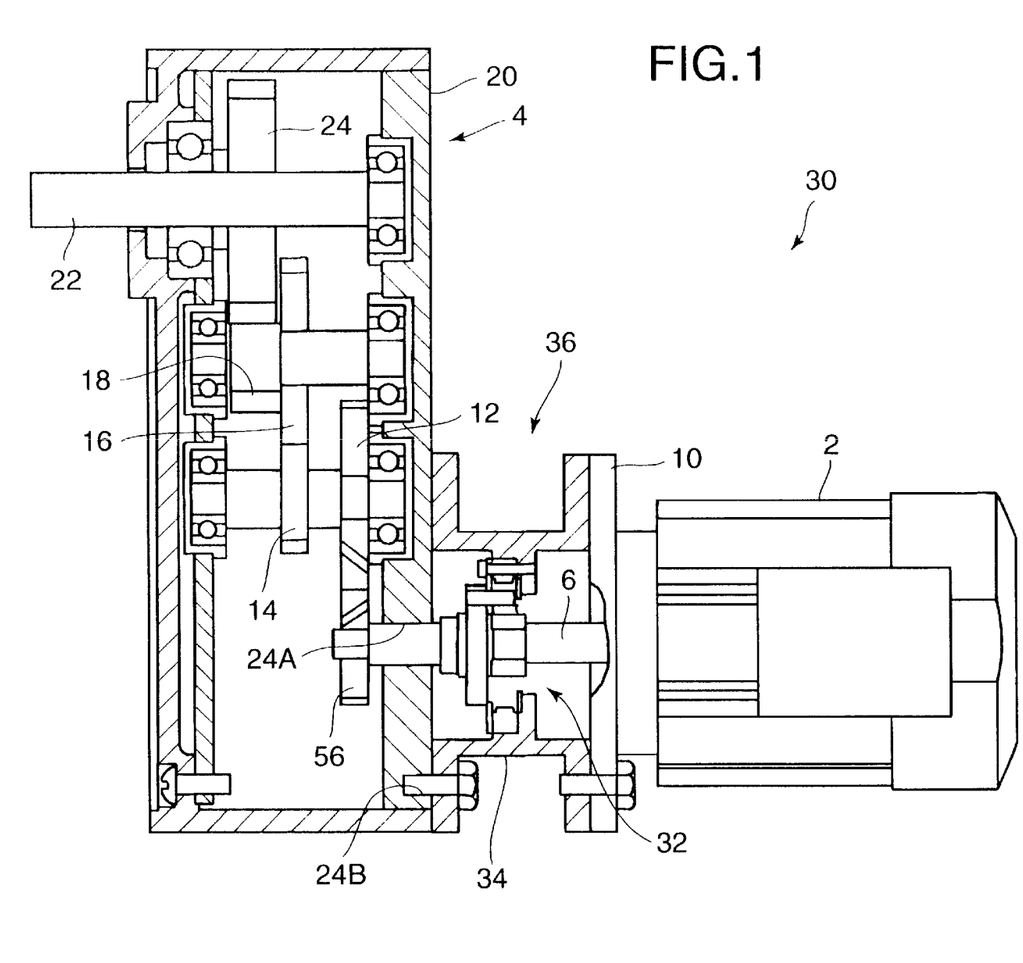
FIG. 1 is a partially sectional view showing a geared motor according to a first embodiment of the present invention.

As shown in FIG. 1, a geared motor 30 according to a first embodiment of the present invention has a motor unit 2 and a change gear unit 4 for transmitting rotational power from the motor unit 2 in combination. This geared motor 30 includes a simple planetary roller unit 36 interposed between the change gear unit 4 and the motor unit 2. The simple planetary roller unit 36 comprises a simple planetary roller mechanism 32 and a casing 34 for accommodating this simple planetary roller mechanism 32.

Here, the motor unit 2 and the change gear unit 4 of this geared motor 30 are almost identical to those of the geared motor 1 shown previously in FIG. 9. Therefore, like parts will be designated by like reference numerals employed in the geared motor 1, and detailed description thereof will be omitted.

Figure 2:
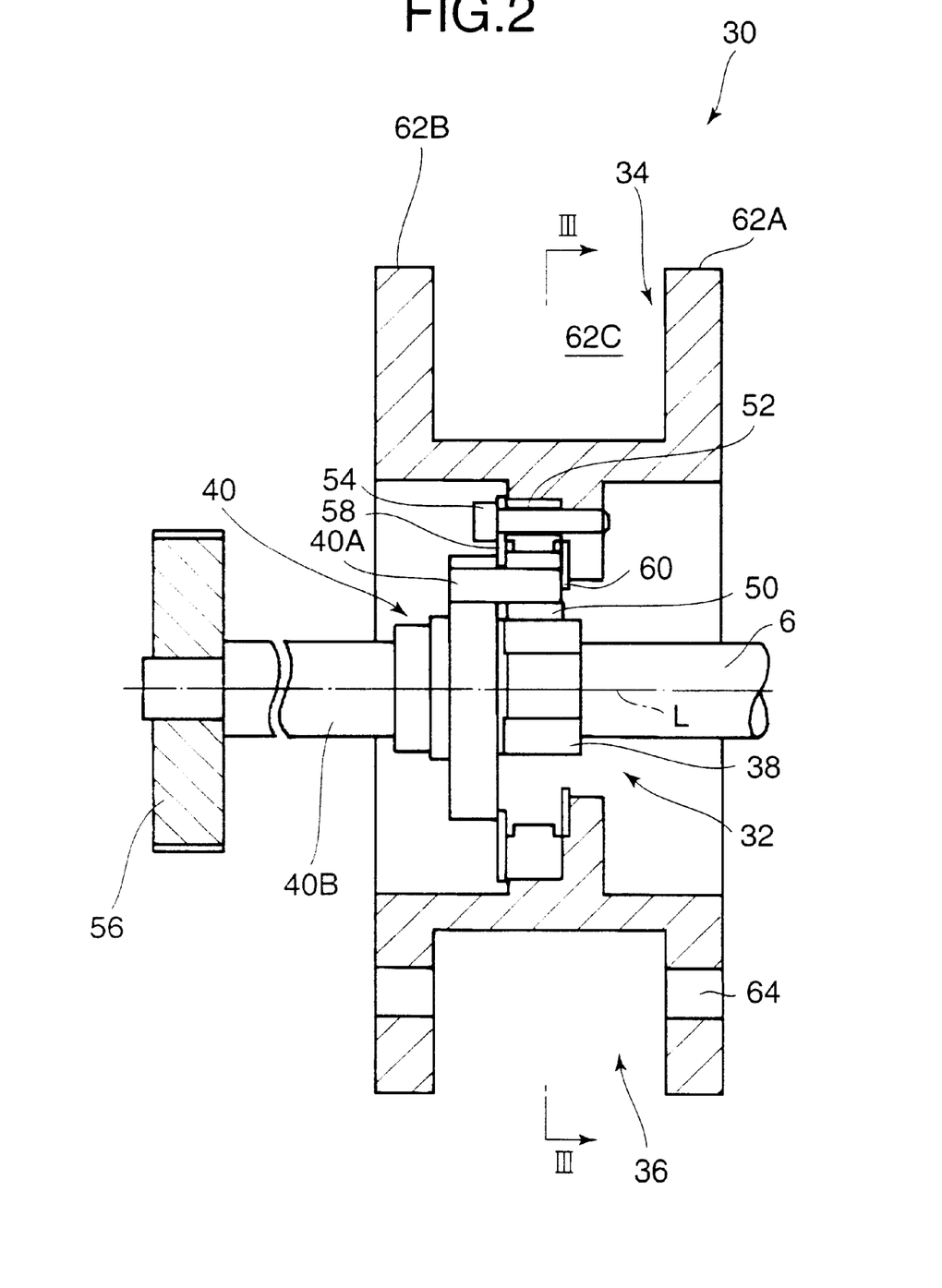
FIG. 2 is a partially sectional enlarged view of a simple planetary roller unit in the geared motor.
Figure 3:
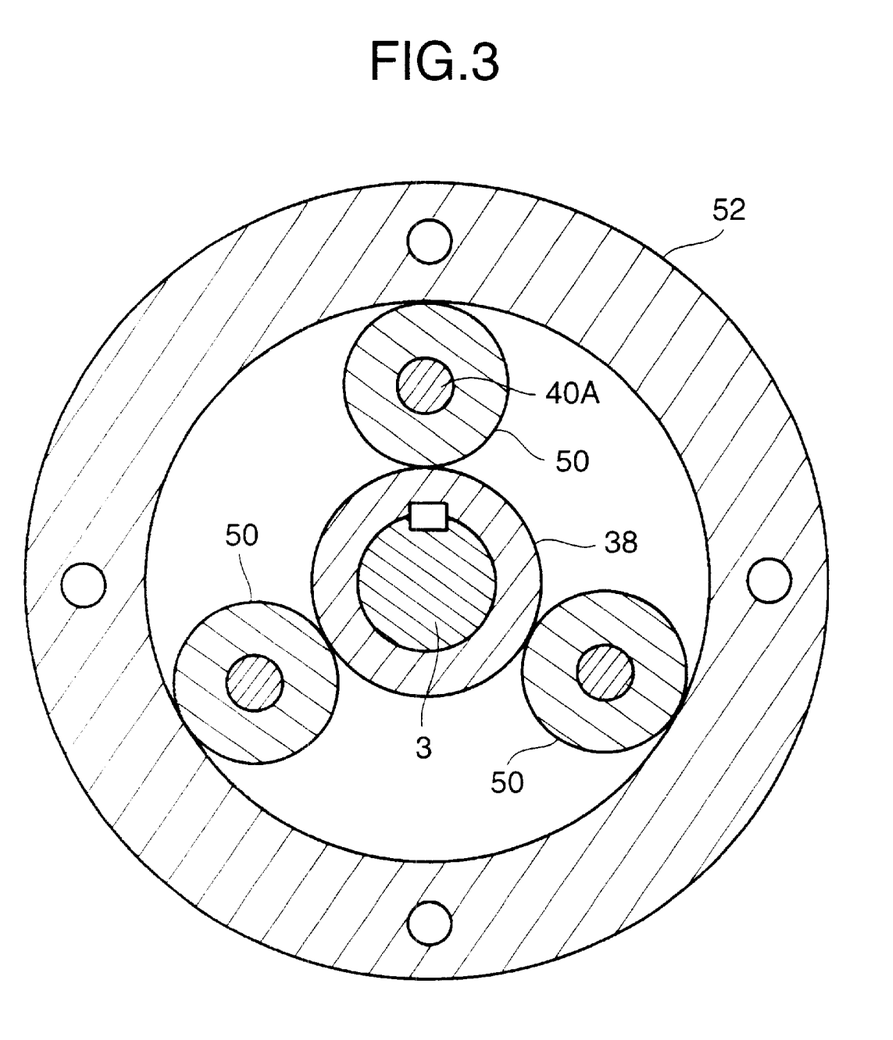
FIG. 3 is a sectional view taken along the line III—III of FIG. 2.

As shown in FIGS. 2 and 3, the simple planetary roller mechanism 32 in the simple planetary roller unit 36 includes a sun roller 38, planetary rollers 50 retained by a carrier 40, and a ring roller 52. The planetary rollers 50 make rolling contact with the outer periphery of the sun roller 38 and with the inner periphery of the ring roller 52.

Specifically, the three planetary rollers 50 are arranged at regular intervals along the circumferential direction of the sun roller 38. The individual planetary rollers 50 are fit with play (meaning that they are capable of sliding rotations) to pins 40A integrally formed on the carrier 40. Incidentally, the number of planetary rollers 50 is not limited to three; for example, four planetary rollers may be arranged at intervals of 90°.

The ring roller 52 is provided with bolt holes formed at regular intervals along its circumferential direction. The ring roller 52 is fixed to the casing 34 with bolts 54 inserted through the bolt holes. The sun roller 38 is coupled to the end of the motor shaft 6 of the motor unit 2 via a not-shown key, so as to make integral rotation with the motor shaft 6. Moreover, on the carrier 40 is integrally formed an input shaft 40B which is coaxial to the center axis L of the sun roller 38. A helical input pinion 56 (identical to the motor pinion 8 in the geared motor 1 shown in FIG. 9) is coupled to the end of the input shaft 40B.

The reference numerals 58 and 60 represent ring-shaped roller restraining members, one of which is coupled to an end face of the ring roller 52 by the bolts 54 described above, and the other is fixed to the interior of the casing. These roller restraining members 58 and 60 keep axially restraining the planetary rollers 50 to prevent the axial movements of the planetary rollers 50.

The casing 34 for accommodating the simple planetary roller mechanism 32 has flange portions 62A and 62B formed on both sides in the direction of the center axis L. The flange portions 62A and 62B spread outward in the radial direction with respect to the direction of the center axis L (in the radial direction of the sun roller 38 and the like). Of these, one flange portion 62A is coupled to the motor flange 10 of the motor unit 2 (part of the casing of the motor unit 2), and the other flange portion 62B is coupled to the casing 24 of the change gear unit 4. On this account, the flange portion 62A on the motor-unit-2 side has a plurality of (tapped) bolt holes 64 formed therethrough along the direction of the center axis L, in the same arrangement as that of the bolt holes 10A in the motor flange 10. The flange portion 62B on the change-gear-unit-4 side are provided with bolt holes 64 formed therethrough along the direction of the center axis L, in the same arrangement as that of the tapped holes 24B formed in the casing 24 of the change gear unit 4.

Since the geared motor 30 is configured as described above, the rotational power from the motor unit 2 is transmitted through the simple planetary roller unit 36 to the change gear unit 4. Moreover, because the casing 34 of the simple planetary roller unit 36 has the double-flange structure, it is possible insert bolts from space 62C between the two flanges 62A and 62B and threadedly engage the bolts with the mating members to be coupled (the motor unit 2 and the reduction gear unit 4) for fixing. Accordingly, this simple planetary roller unit can be surely mounted irrespective of the conditions of the mating member's mounting surfaces.

In general terms, the double-flange structure of the casing 34 unfavorably reduces the internal space of the casing 34. It is, however, rather advantageous when a simple planetary roller mechanism 32 is to be arranged inside as in the present embodiment, since one of the sun roller 38, the carrier 40, and the ring roller 52 needs to be fixed to the casing 34.

Additionally, this simple planetary roller mechanism 32 can achieve high change gear ratios and fine adjustments in change gear ratio, as well as suppression of noise as compared with geared structures. In other words, the simple planetary roller mechanism 32 has a highly excellent "change-gear-ratio-adjusting function."

Now, a geared motor according to a second embodiment of the present invention will be described in detail.

Figure 4:
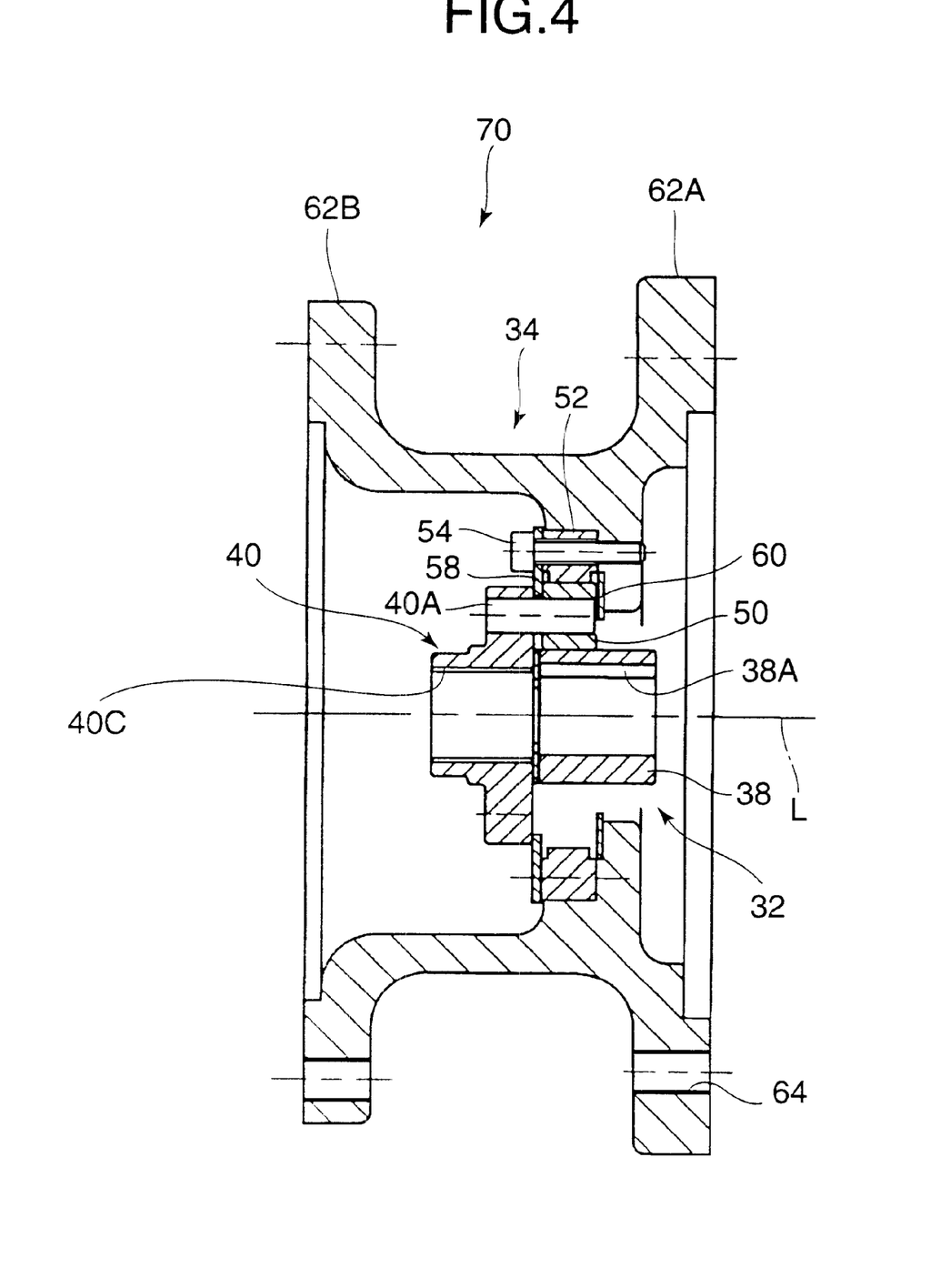
FIG. 4 is a partially sectional view showing the simple planetary roller unit in a geared motor according to a second embodiment of the present invention.

Description will first be given of a simple planetary roller unit 70 shown in FIG. 4, to be incorporated into the geared motor. This simple planetary roller unit 70 comprises a simple planetary roller mechanism 32 and a casing 34 for accommodating the same. The simple planetary roller mechanism 32 has traction rollers consisting of a sun roller 38, planetary rollers 50 retained by a carrier 40, and a ring roller 52, the planetary rollers 50 making rolling contact with the outer periphery of the sun roller 38 and with the inner periphery of the ring roller 52.

The ring roller 52 is fixed to the casing 34 for rotational restraint. The sun roller 38 has a shaft insertion hole 38A formed through its rotational center. Either the motor shaft of a motor unit or the input shaft of a change gear unit (the motor shaft, in the present embodiment) can be inserted to the shaft insertion hole 38A. The carrier 40 also has a shaft insertion hole 40C formed through its rotational center. The other of the motor shaft of the motor unit and the input shaft of the change gear unit (the input shaft, in the present embodiment) can be inserted to the shaft insertion hole 40C.

The casing 34 has flange portions 62A and 62B integrally formed on both sides. Of these, one flange portion 62A (on the sun-roller-38 side) is provided with bolt holes and the like so as to match with the mounting surfaces of motor units to be described later. The other flange portion 62B (on the carrier-40 side) is provided with bolt holes and the like so as to match with the mounting surfaces of change gear units to be described later.

In other words, this simple planetary roller unit 70 is designed with the serialization of geared motors in mind. When both a variety of motors connectable to the flange portion 62A and a variety of change gear units connectable to the other flange portion 62B are prepared in advance, they can be combined with each other to provide a geared motor series for a wide variety of applications.

Here, the simple planetary roller mechanism 32 and the like in this simple planetary roller unit 70 are otherwise identical in configuration to those of the simple planetary roller unit 36 shown previously in FIG. 2. Therefore, like parts will be designated by like reference numerals, and detailed description thereof will be omitted.

Now, description will be given of a geared motor series incorporating the simple planetary roller units 36, 70.

Figure 5:
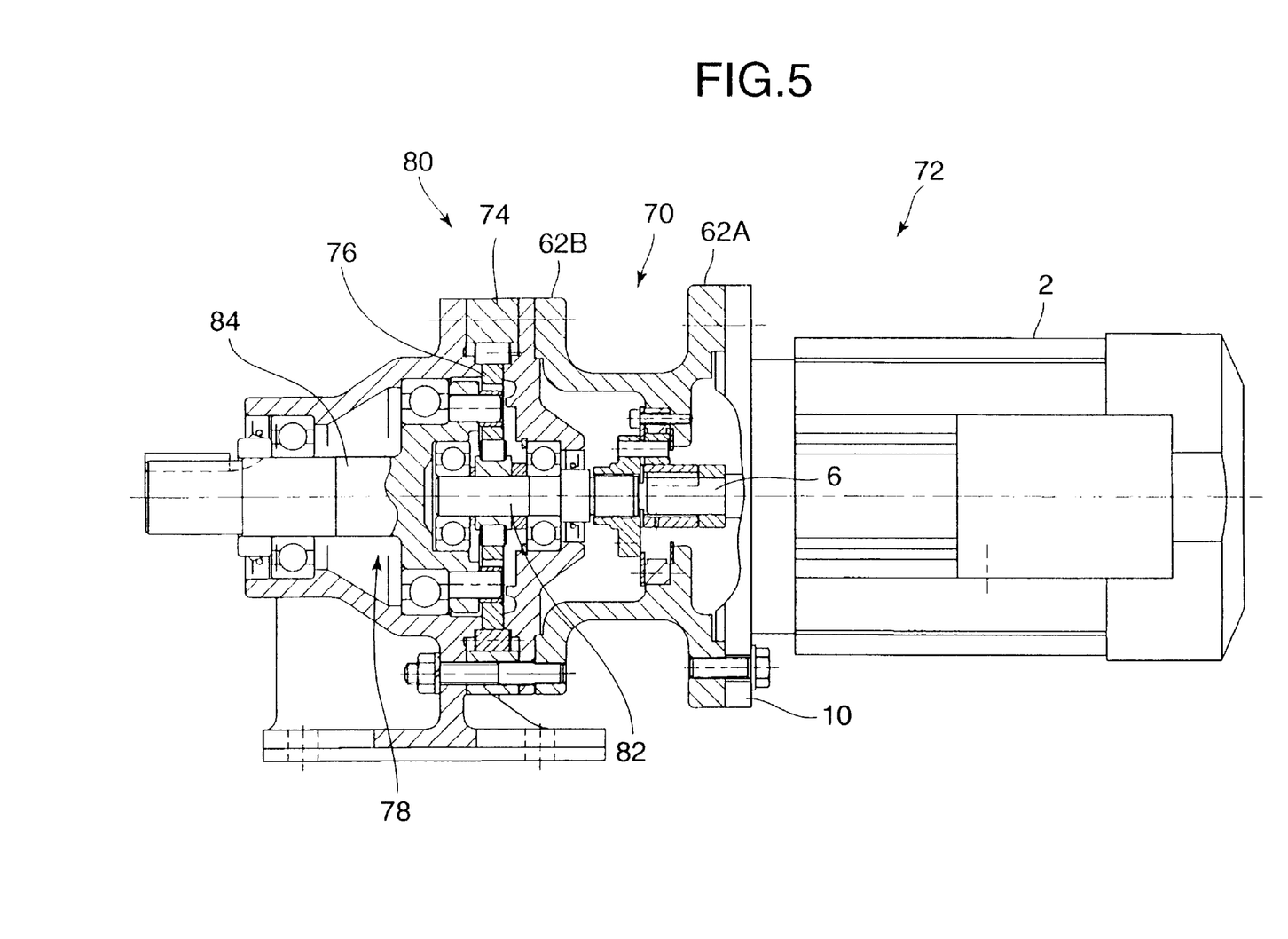
FIG. 5 is a partially sectional view showing the geared motor using the simple planetary roller unit.

As shown in FIG. 5, a geared motor 72 according to a first example of the geared motor series includes the motor unit 2 coupled to the flange portion 62A on the sun-roller-38 side and a change gear unit 80 coupled to the flange portion 62B on the carrier-40 side.

The change gear unit 80 contains an oscillating internal meshing gear reduction mechanism having an internal gear and an external gear internally meshing with the internal gear, the center axis of the internal gear lying inside the periphery of the external gear (the gearing corresponding to International Patents Classification F16H 1/32).

The motor shaft 6 of the motor unit 2 is inserted to the shaft insertion hole 38A in the sun roller 38, so as to be engaged with the same in the direction of rotation via a spline connection. Besides, an input shaft 82 which causes an external gear 76 in the change gear unit 80 to make eccentric oscillating rotations is spline-connected to the shaft insertion hole 40C formed in the carrier 40.

In this geared motor 72, rotational power from the motor unit 2 is reduced in speed and transmitted to the input shaft 82 through the simple planetary roller unit 70. The rotational power transmitted to the input shaft 82 enters the oscillating internal meshing gear reduction mechanism 78, in which only the rotational component of the external gear 76 is extracted and transmitted to the output shaft 84.

The change gear unit 80 containing the oscillating internal meshing gear reduction mechanism 78 of this type particularly easily produces vibrations and noises due to the eccentric rotations of its external gear 76. Nevertheless, it has been confirmed as described above that the presence of the simple planetary roller unit 70 greatly reduces the total noises and vibrations beyond expectations.

Next, a geared motor 84 according to a second example of the geared motor series will be described with reference to FIG. 6. In this geared motor 84, the motor unit 2 is coupled to the flange portion 62A on the sun-roller-38 side of the simple planetary roller unit 70, and a change gear unit 88 containing an orthogonal axis gear reduction mechanism 86 is coupled to the flange portion 62B on the other side.

This orthogonal axis gear reduction mechanism 86 comprises: an input shaft 90 which is spline-connected to the shaft insertion hole 40C in the carrier 40 at one end and has a hypoid pinion 90A integrally formed on the other end; a hypoid gear 92 which has a rotational center axis orthogonal to the axial direction of the input shaft 90, and meshes with the hypoid pinion 90A; a first pinion 94 for making coaxial, integral rotation with the hypoid gear 92; a first gear 96 meshing with the first pinion 94; a second pinion 98 for making coaxial, integral rotation with the first gear 96; an output shaft gear 100 meshing with the second pinion 98; and an output shaft 102 of hollow type, supporting the output shaft gear 100. The input shaft 90 and the output shaft 100 are orthogonal to each other.

In this geared motor 84, rotational power from the motor unit 2 is transmitted to the 90°-tilted output shaft 102 through the simple planetary roller mechanism 32 and the orthogonal axis gear reduction mechanism 86 with a predetermined reduction gear ratio.

Figure 7:
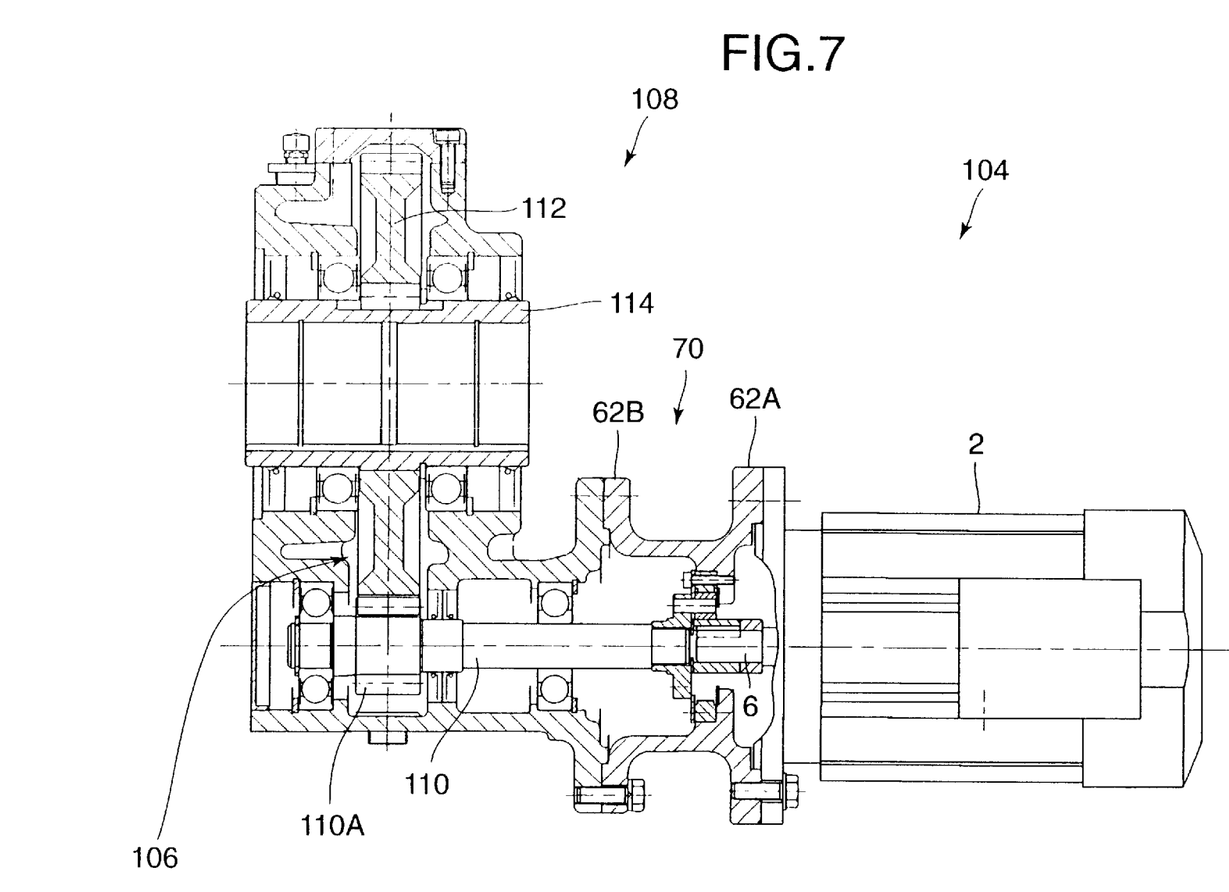
FIG. 7 is a partially sectional view showing the geared motor coupled with another change gear unit.

Next, a geared motor 104 according to a third example of the geared motor series will be described with reference to FIG. 7.

In this geared motor 104, the motor unit 2 is coupled to the flange portion 62A on the sun-roller-38 side of the simple planetary roller unit 70, and a change gear unit 108 containing a parallel axis gear reduction mechanism 106 is coupled to the flange portion 62B on the other side.

This parallel axis gear reduction mechanism 106 comprises: an input shaft 110 spline-connected to the shaft insertion hole 40C in the carrier 40 at one end and coupled with an input pinion 110A at the other end; an output gear 112 meshing with the input pinion 110A; and an output shaft 114 of hollow type, piercing through the center of the output gear 112 and being in engagement with this output gear 112 in the direction of rotation. The input shaft 110 and the output shaft 114 are parallel to each other.

Figure 8:
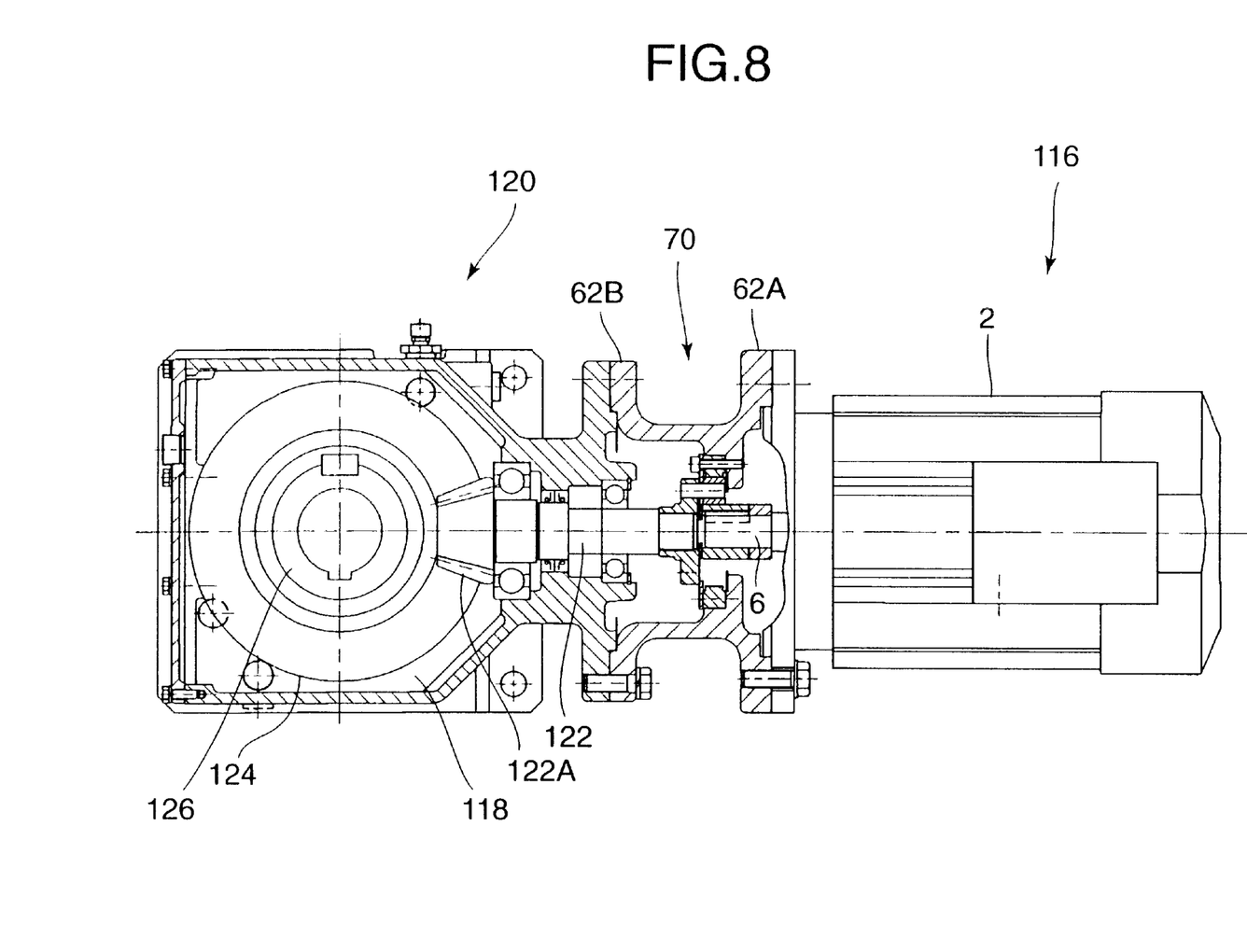
FIG. 8 is a partially sectional view showing the geared motor coupled with another change gear unit.

Next, a geared motor 116 according to a fourth example of the geared motor series will be described with reference to FIG. 8.

In this geared motor 116, the motor unit 2 is coupled to the flange portion 62A on the sun-roller-38 side of the simple planetary roller unit 36, and a change gear unit 120 containing an orthogonal axis gear reduction mechanism 118 using bevel gears is coupled to the flange portion 62B on the other side. This orthogonal axis gear reduction mechanism 118 using bevel gears comprises: an input shaft 122 which is spline-connected to the shaft insertion hole 40C in the carrier 40 at one end and has a bevel gear pinion 122A integrally formed on the other end; an output shaft bevel gear 124 meshing with the bevel gear pinion 122A; and an output shaft 126 of hollow type, supporting the output shaft bevel gear 124 and having a rotation axis orthogonal to the input shaft 122.

Figure 6:
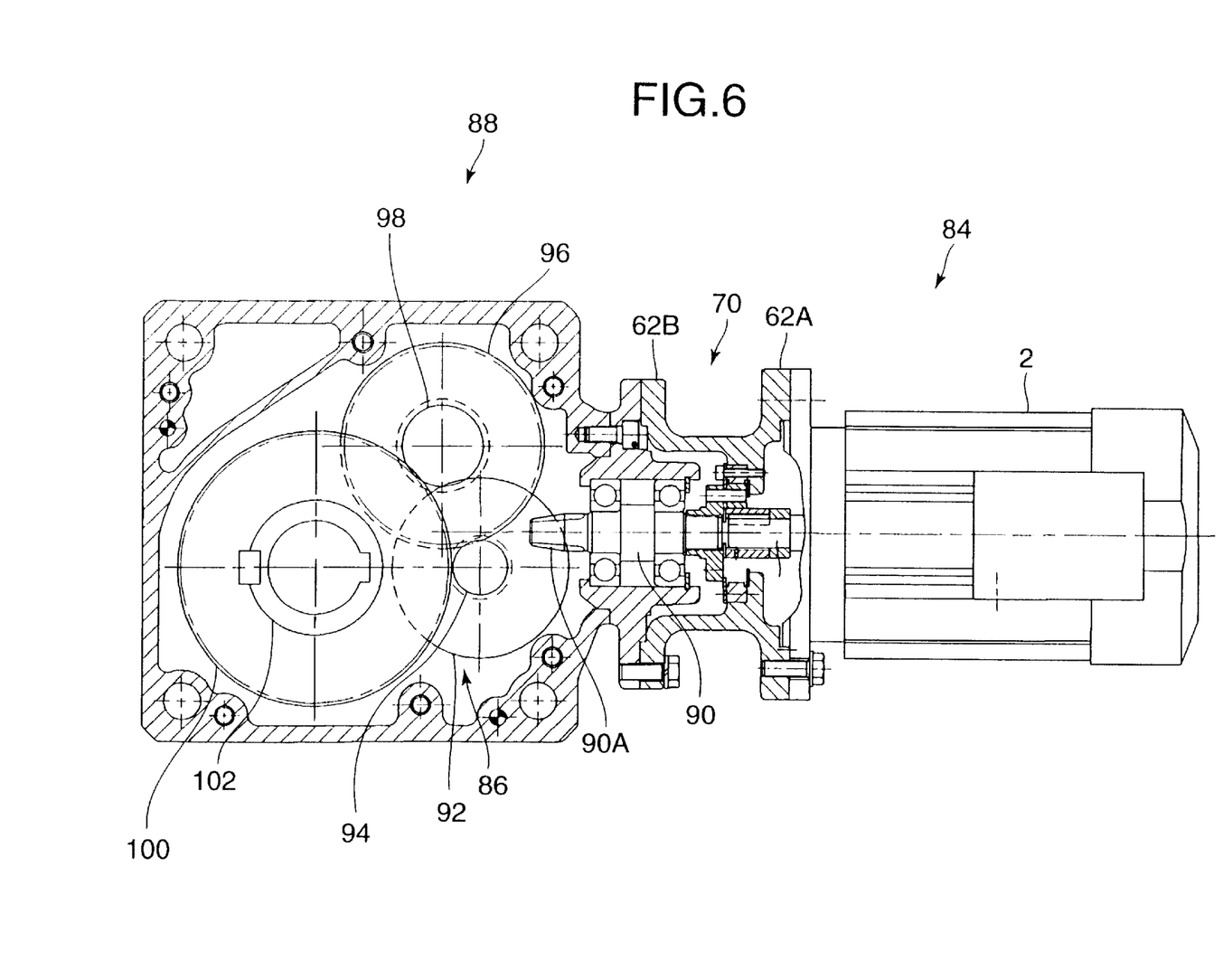
FIG. 6 is a partially sectional view showing the geared motor coupled with another change gear unit.

Accordingly, the rotation axes of the input shaft 122 and the output shaft 126 in this geared motor 116 intersect each other, while the input shaft 90 and the output shaft 102 in the geared motor 84 shown in FIG. 6 are orthogonal but staggered.

As has been described above, when the simple planetary roller mechanisms 36 and 70 having a casing of double-flange type, containing a simple planetary roller mechanism are used to function just like a coupling, a plurality of types of motor units and a plurality of types of change gear units can be easily combined with each other. This allows the provision of a geared motor series including wide variations.

According to the present invention, it is possible to obtain a geared motor which can flexibly and surely meet the needs for a wide variety of change gear ratios with low-noise compact configuration, or a geared motor series from which a plurality of types of such geared motors can be constructed.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A geared motor comprising a motor unit and a change gear unit for transmitting rotational power from said motor unit in combination, said change gear unit being arranged with its input shaft coaxial to a motor shaft of said motor unit, wherein:

a simple planetary roller unit including a simple planetary roller mechanism and a casing for accommodating said simple planetary roller mechanism is interposed between said change gear unit and said motor unit, said simple planetary roller mechanism having a sun roller, a planetary roller retained by a carrier, and a ring roller, said planetary roller making rolling contact with the outer periphery of said sun roller and with the inner periphery of said ring roller; and flange portions spreading outward in the radial directions of said sun roller are formed on said casing for accommodating said simple planetary roller mechanism, at both ends in the axial direction of said sun roller, and one of said flange portions is coupled to a casing of said motor unit and the other is coupled to a casing of said change gear unit, and said geared motor is configured so that rotational power from said motor unit is coaxially transmitted to said change gear unit through said simple planetary roller unit.

2. The geared motor according to claim 1, wherein:

both of said flange portions have a plurality of bolt holes formed therethrough along the axial direction of said sun roller so as to be identical to each other in arrangement; and mounting bolts inserted to said bolt holes couple said flange portions to said casings of said motor unit and said change gear unit, respectively.

3. The geared motor according to claim 1 or 2, wherein:

said ring roller is fixed to said casing for accommodating said simple planetary roller mechanism so that the rotation of said ring roller is restrained;

a shaft insertion hole is formed on the rotational center of said sun roller, and either said motor shaft of said motor unit or said input shaft of said change gear unit is inserted to said shaft insertion hole; and a shaft insertion hole is formed on the rotational center of said carrier,and the other of said motor shaft and said input shaft is inserted to said shaft insertion hole, so that rotational power from said motor unit is coaxially transmitted to said change gear unit through said simple planetary roller mechanism.

4. A series of geared motors according to any one of claims 1, or 2 comprising a motor unit selection group including a plurality of types of motor units as said motor unit and a change gear unit selection group including a plurality of types of change gear units as said change gear unit, wherein said motor unit and said change gear unit each selected from among said respective selection groups are combined to allow selection of said geared motor of-arbitrary type.

5. A series of geared motors according to claim 3, comprising a motor unit selection group including a plurality of types of motor units as said motor unit and a change gear unit selection group including a plurality of types of change gear units as said change gear unit, wherein said motor unit and said change gear unit each selected from among said respective selection groups are combined to allow selection of said geared motor of arbitrary type.

* * * * *